United States Patent
Rao et al.

(10) Patent No.: US 10,033,326 B2
(45) Date of Patent: Jul. 24, 2018

(54) TEMPERATURE BASED ELECTRIC MACHINE CONTROL

(71) Applicant: Ford Global Technologies, LLC, Dearborn, MI (US)

(72) Inventors: Balakrishna Rao, Canton, MI (US); Rimma Isayeva, Farmington Hills, MI (US); Daniel Luedtke, Beverly Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 110 days.

(21) Appl. No.: 15/160,037

(22) Filed: May 20, 2016

(65) Prior Publication Data

US 2016/0268955 A1    Sep. 15, 2016

Related U.S. Application Data

(63) Continuation of application No. 13/600,964, filed on Aug. 31, 2012, now Pat. No. 9,352,656.

(51) Int. Cl.
    *B60L 1/00*     (2006.01)
    *H02P 29/68*    (2016.01)
    (Continued)

(52) U.S. Cl.
    CPC ............ *H02P 29/68* (2016.02); *B60L 3/0038* (2013.01); *B60L 3/06* (2013.01); *B60L 11/18* (2013.01); *B60L 15/20* (2013.01); *H02K 1/2766* (2013.01); *H02K 11/25* (2016.01); *H02K 15/00* (2013.01); *B60K 2001/006* (2013.01); *B60L 2240/423* (2013.01); *B60L 2240/425* (2013.01);
    (Continued)

(58) Field of Classification Search
    CPC ..... Y02T 10/641; H02P 29/68; H02K 1/2766; H02K 11/25; H02K 15/00; B60L 11/18; B60L 3/0038; B60L 15/20; B60L 2240/423; B60L 2260/44; B60K 2001/006
    See application file for complete search history.

(56) References Cited

U.S. PATENT DOCUMENTS 6,960,152 B2    11/2005 Aoki et al.
7,789,794 B2 *  9/2010 Hong ................. B60K 1/00
                                              180/65.285
(Continued)

FOREIGN PATENT DOCUMENTS

| CN | 101150278 A | 3/2008 |
| DE | 10235433 B4 | 3/2012 |
| JP | 2011125121 A | 6/2011 |

*Primary Examiner* — Jared Fureman
*Assistant Examiner* — Duc M Pham
(74) *Attorney, Agent, or Firm* — David B. Kelley; Brooks Kushman P.C.

(57) ABSTRACT

A vehicle having at least two electric machines includes an oil circulation path that circulates oil through the electric machines. A controller commands the electric machines to fulfill torque demands. The controller utilizes the oil temperature in the oil circulation path to control the commanded torque output by the electric machines. In the event of a failure or fault in an oil temperature sensor, the controller estimates the oil temperature from the temperature of coils within at least one of the electric machines. The estimated oil temperature is utilized instead of the sensed oil temperature to control the torque outputs to satisfy torque demands.

14 Claims, 3 Drawing Sheets

(51) Int. Cl.
*B60L 11/18* (2006.01)
*B60L 3/00* (2006.01)
*B60L 3/06* (2006.01)
*B60L 15/20* (2006.01)
*H02K 1/27* (2006.01)
*H02K 15/00* (2006.01)
*H02K 11/25* (2016.01)
*B60K 1/00* (2006.01)

(52) U.S. Cl.
CPC .......... *B60L 2260/44* (2013.01); *Y02T 10/641* (2013.01); *Y02T 10/645* (2013.01); *Y02T 10/72* (2013.01); *Y02T 10/7275* (2013.01)

(56) References Cited

U.S. PATENT DOCUMENTS

| | | |
|---|---|---|
| 8,046,126 B2 | 10/2011 | Yanagida et al. |
| 2004/0235613 A1* | 11/2004 | Aoki ...................... B60K 6/445 477/3 |
| 2004/0263099 A1 | 11/2004 | Aoki et al. |
| 2008/0036415 A1* | 2/2008 | Kaizuka .............. H02P 21/0003 318/730 |
| 2008/0254935 A1* | 10/2008 | Kasuga .................. B60K 6/365 477/3 |
| 2010/0125395 A1 | 5/2010 | Horii et al. |

* cited by examiner

TEMPERATURE BASED ELECTRIC MACHINE CONTROL

CROSS-REFERENCE TO RELATED APPLICATIONS

This application is a continuation of U.S. application Ser. No. 13/600,964 filed Aug. 31, 2012, now U.S. Pat. No. 9,352,656 issued May 31, 2016, the disclosure of which is hereby incorporated in its entirety by reference herein.

TECHNICAL FIELD

The present disclosure relates to controlling a vehicle electric machine.

BACKGROUND

Battery electric vehicles (BEVs) include a traction battery that is rechargeable from an external electric power source and powers the electric machine. Hybrid electric vehicles (HEVs) include an internal combustion engine, one or more electric machines, and a traction battery that at least partially powers the electric machine. Plug-in hybrid electric vehicles (PHEVs) are similar to HEVs, but the traction battery in a PHEV is capable of recharging from an external electric power source. These examples are vehicles capable of being at least partially driven by an electric machine.

Oil temperatures in electric machines are monitored, as well as coil temperature within the windings of the electric machine. Any inaccuracies in the temperature readings can lead to incorrect torque adjustments in the electric machine, and thus could limit the performance of the vehicle.

SUMMARY

In one embodiment, a vehicle includes a traction motor and a generator, each of which including windings. An oil circulation path circulates oil between the traction motor and the generator and includes an oil temperature sensor. At least one controller is configured to alter a current provided to at least one of the traction motor and the generator based on a fault in the oil temperature sensor. The altering of the current is based on a temperature of the traction motor windings and the temperature of the generator windings. This maintains a requested torque output by the traction motor and the generator to provide sufficient torque to fulfill demand.

In another embodiment, a vehicle comprises an electric machine including coils, and at least one controller. The at least one controller is configured to alter a current provided to the electric machine based on a temperature of the coils to control or maintain a torque output by the electric machine.

In yet another embodiment, a method for controlling an electric machine includes altering a current provided to the electric machine. The altering is in response to a change in temperature of the coils of the electric machine, such that a torque output by the electric machine is maintained in accordance with a requested torque.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
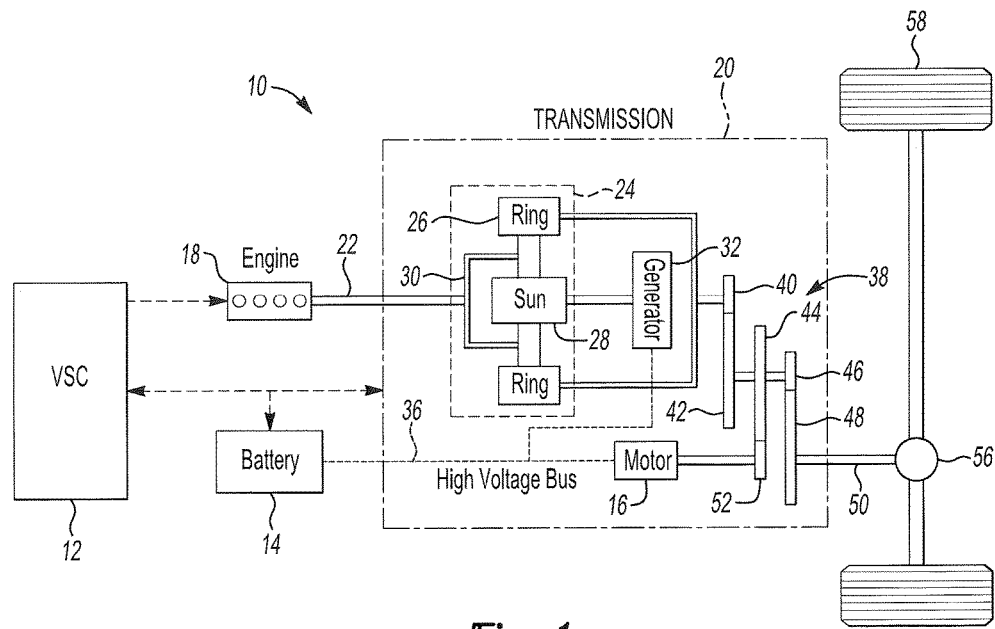
FIG. 1 is a schematic diagram of a vehicle.

Referring to FIG. 1, vehicle 10 includes a power-split powertrain. A vehicle system controller (VSC) 12 is provided, and is generally referred to as a controller 12. The controller 12 controls the power distribution in the powertrain of the vehicle 10. A battery 14 is provided and is controlled by the controller 12. The battery 14 has a two-way electrical connection, such that it receives and stores electric energy through regenerative braking, for example, and also supplies the energy to an electric machine, or an electric traction motor 16. The controller 12 also controls the operation of an internal combustion engine (ICE) 18. Both the motor 16 and the engine 18 are capable of powering a transmission 20 that ultimately delivers torque to the wheels of the vehicle 10.

Although the control system of the vehicle 10 is illustrated to have a VSC 12, such a control system can include more than one controller. For example, a separate battery control module (BCM) can directly control the battery 14. Furthermore, a separate motor/generator control module (MGCU) can be directly connected to the motor 16 and to the other electric machines and controllers in the vehicle 10. It should be understood that any and all contemplated controllers in the vehicle 10 are each hereinafter referred to as a "controller".

The engine 18 delivers power to a torque input shaft 22 that is connected to a planetary gear set 24 through a one way clutch. The input shaft 22 powers the planetary gear set 24. The planetary gear set 24 includes a ring gear 26, a sun gear 28, and a planetary carrier assembly 30. The input shaft 22 is driveably connected to the carrier assembly 30 which, when powered, can rotate the ring gear 26 and/or the sun gear 28. The sun gear 28 is driveably connected to a generator 32. The generator 32 can be engaged with the sun gear 28, such that the generator 32 can either rotate with the sun gear 28, or not rotate with it. Like the motor 16, the generator 32 can be referred to as an electric machine which, when utilized in other vehicle powertrain configurations, is capable of both generating electric power and providing motive power.

When the engine 18 is coupled to the planetary gear set 24, the generator 32 generates energy as a reactionary element to the operation of the planetary gear set 24. Electric energy generated from the generator 32 is transferred to the battery 14 through electrical connections 36. The battery 14 also receives and stores electric energy through regenerative braking, wherein torque is transmitted from the wheels and back through the transmission 20, into the generator 32 and stored in the battery 14. The battery 14 supplies the stored electric energy to the motor 16 for operation. The portion of the power delivered from the engine 18 to the generator 32 can also be transmitted directly to the motor 16. The battery 14, motor 16, and generator 32 are each interconnected in a two-way electric flow path through electrical connections 36 that can include a high voltage bus.

The vehicle can be powered by the engine 18 alone, by the battery 14 and motor 16 alone, or by a combination of the engine 18 with the battery 14 and motor 16. In a mechanical drive mode, or a first mode of operation, the engine 18 is activated to deliver torque through the planetary gear set 24. The ring gear 26 distributes torque to step ratio gears 38 comprising meshing gear elements 40, 42, 44, and 46. Gears 42, 44, and 46 are mounted on a countershaft, and gear 46 distributes torque to gear 48. Gear 48 then distributes torque to a torque output shaft 50. In the mechanical drive mode, the motor 16 can also be activated to assist the engine 18 in powering the transmission 20. When the motor 16 is active in assisting, gear 52 distributes torque to gear 44 and to the countershaft.

In an electric drive mode (EV mode), or a second mode of operation, the engine 18 is disabled or otherwise prevented from distributing torque to the torque output shaft 50. In the EV mode, the battery 14 powers the motor 16 to distribute torque through gear 52, step ratio gears 38 and the torque output shaft 50. The torque output shaft 50 is connected to a differential and axle mechanism 56 which distributes torque to traction wheels 58. The controller 12 controls the battery 14, engine 18, motor 16 and generator 32 in order to distribute torque to the wheels 58 in either the mechanical drive mode or the EV mode. The controller 12 commands the amount of power output by each of the power sources such that driver demand is fulfilled.

As previously described, there are two power sources for the driveline. The first power source is the engine 18, which delivers torque to the planetary gear set 24. The other power source involves only the electric drive system, which includes the motor 16, the generator 32 and the battery 14, in which the battery 14 acts as an energy storage medium for the generator 32 and the motor 16. The generator 32 can be driven by the planetary gear set 24, and can alternatively act as a motor and deliver power to the planetary gear set 24. Either or both of the motor 16 and the generator 32 can be referred to as motors, generators, and/or electric machines, as both are capable of delivering and absorbing energy.

It should be understood that while a power-split powertrain is illustrated in the vehicle 10, the vehicle 10 can include many other configurations. As such, it is contemplated that individual components of the powertrain can differ to suit various particular applications. For example, in another configuration that does not include a planetary gear set 24, an electric machine can be provided to operate as a generator by receiving torque from the engine or regenerative braking, while the same electric machine can also operate as a motor by receiving power from the traction battery and providing torque through the transmission. Other vehicle configurations of vehicle powertrains and implementations of electric machines are contemplated, and are therefore considered to be within the scope of the present disclosure.

Figure 2:
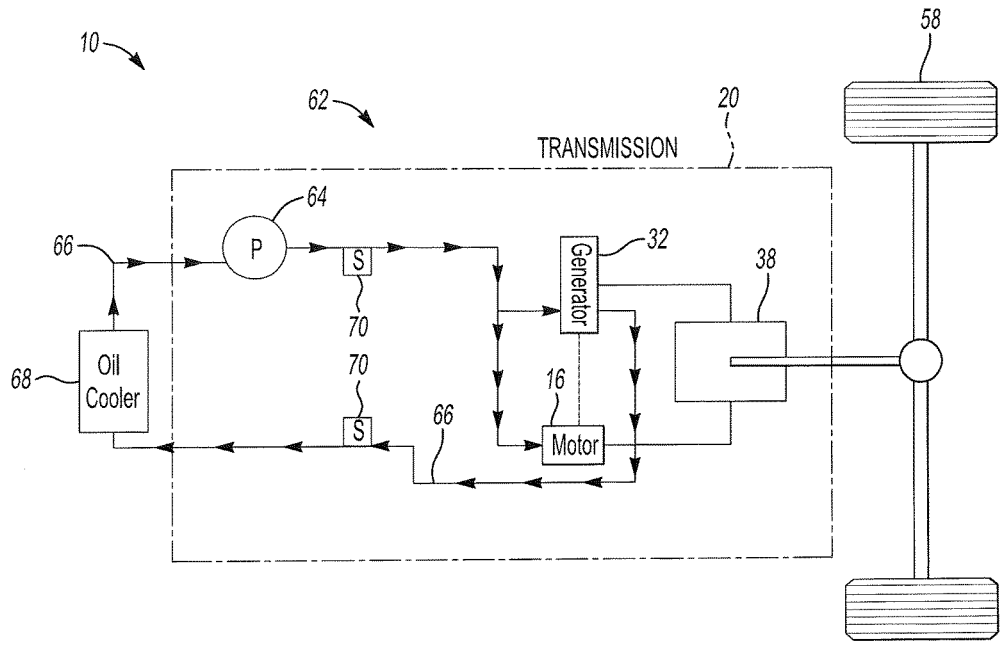
FIG. 2 is a schematic diagram of a vehicle illustrating an oil coolant system for regulating the temperature of electric machines in the vehicle.

Referring to FIG. 2, a schematic of the vehicle 10 is shown, illustrating an electric machine oil circulation system 62. The oil circulation system 62 includes an oil pump 64 that pumps oil through an oil circulation path 66. Throughout the transmission 20, the oil in the oil circulation path 66 is pumped through one or both of the generator 32 and the motor 16. The oil works to cool and regulate the temperature of both electric machines such that proper torque is transmitted through the gears 38 and to the wheels 58.

An oil cooler 68 is provided along the oil circulation path 66 and outside of the transmission 20, although it is contemplated that the oil cooler 68 can be mounted inside the transmission 20. The oil cooler cools the flow of oil through heat exchange with the surrounding air and/or other coolant liquids.

Oil temperature sensors 70 are provided in various locations along the oil flow circulation path 66. The sensors 70 detect the temperature of the oil throughout the transmission 20, including before and after traveling through the motor 16 and the generator 32. The sensors 70 communicate the temperature of the oil with the VSC 12, such that the VSC 12 or other controllers can adjust torque output by the electric machines based on the temperature of the oil.

It should be understood that the oil circulation system 62 and the oil flow circulation path 66 is but one example for illustrative purposes, and other configurations are contemplated. For example, it is contemplated that each of the motor 16 and generator 32 can include a respective individual oil circulation path, pump and/or oil cooler. Furthermore, more or less electric machines can be utilized in the powertrain configuration, and the amount of oil, the type of oil cooler, and the length of the circulation path can vary.

Figure 3:
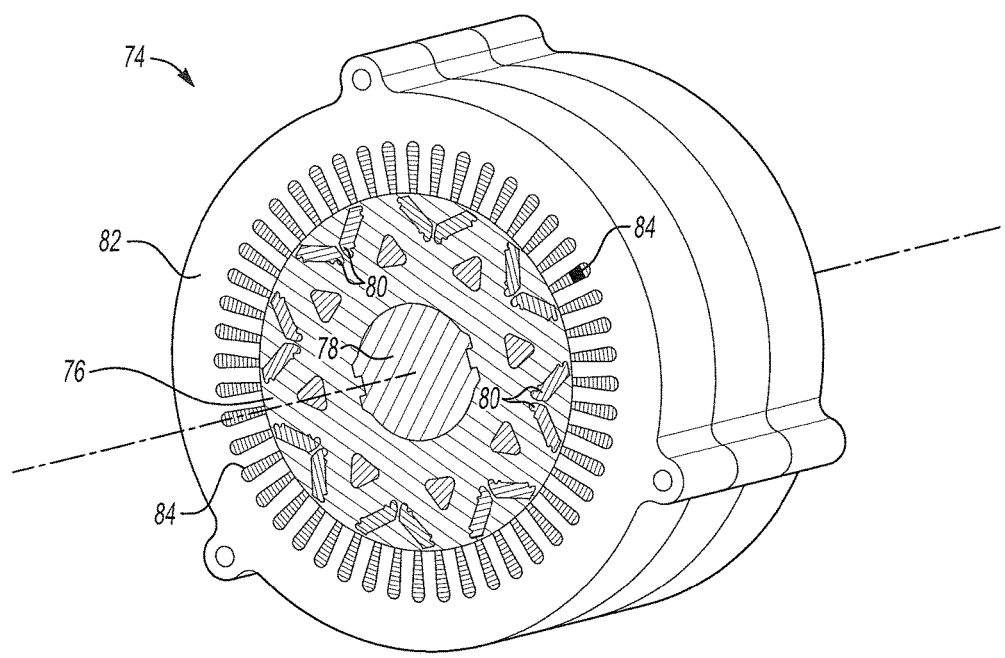
FIG. 3 is a schematic view, in cross-section, of an electric machine.

Referring to FIG. 3, an electric machine 74 is illustrated. The electric machine 74 refers to either the motor 16 or the generator 32. A rotor 76 is provided that is operable to rotate about a shaft 78. Magnets 80 are circumferentially mounted within the rotor 76. The rotor 76 is enclosed by a stationary stator 82. Coils or windings 84 are provided throughout the interior surface of the stator 82. The electric machine 74 operates in known fashion, as mechanical and electrical power can be formed or generated by the interaction between the relative rotation of the magnets 80 and the windings 84. Winding temperature sensors 86 are disposed in various locations throughout the windings 84 to communicate the temperature of the windings to the VSC 12.

It should be understood that the electric machine 74 illustrated is only for exemplary purposes. Many various configurations of electric machines in vehicles are known in the art. For example, the magnets can be exposed about the face of the rotor or can be mounted on the stator while the windings rotate with the rotor. Other configurations are contemplated.

Referring to FIGS. 1-3, optimum torque distribution through the transmission 20 and to the wheels 58 depends on an accurate reading of the temperature of the oil in the oil circulation system 62. Any incorrect or inaccurate readings of the temperature of the oil can lead to incorrect torque adjustments output by the motor 16 and generator 32. For example, if the actual temperature of the oil is higher than detected, the commanded torque value output by the motor 16 may be lower than the desired motor torque. Other torque inaccuracies can be caused by an inaccurate oil temperature reading because as the temperature of the oil increases, more power output by the electric machines must be commanded in order to fulfill or maintain the desired power output. Any fault or failure in the oil temperature sensors 70 must therefore be resolved.

Figure 4:
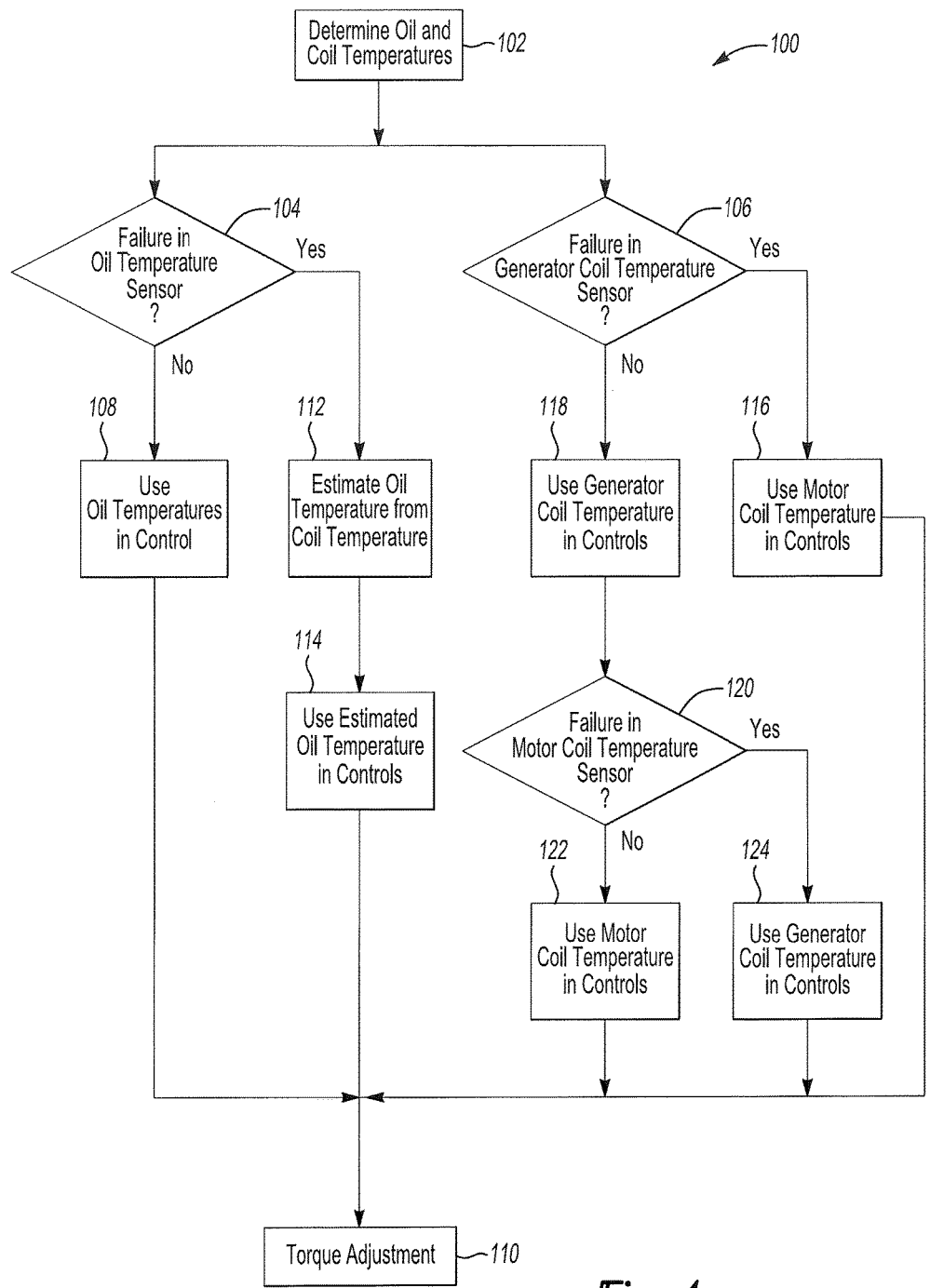
FIG. 4 is a flow chart illustrating an algorithm for controlling at least one electric machine.

Referring to FIG. 4, a method for adjusting torque in the event of a failure in a temperature sensor is illustrated at 100. In short, this method 100 detects a failure in the oil temperature sensor, and estimates the temperature of the oil based on the temperature of the coil windings of the electric machines such that proper torque distribution can be maintained.

At operation 102, the oil temperature and the coil temperatures are determined by the sensors 70, 86 and relayed to the VSC 12. At operations 104 and 106, it is determined whether any failures in the oil temperature sensor 70 or in the coil temperature sensor 86 in one of the electric machines is present. Beginning with the oil temperature sensor 70, if no failure or fault is present in the sensor 70, then at operation 108 the sensed temperatures of the oil is utilized in the final torque adjustment in the transmission 20 at operation 110. In other words, if no faults in the oil temperature sensor exist, then the oil temperature is used in its normal manner in determining how much torque should be output by the motor 16 and/or generator 32.

Alternatively, if a failure or fault is indeed present in the oil temperature sensor 70, the oil temperature is estimated at operation 112. The oil temperature can be estimated using equation (1) below:

$$T_{oil\_est} = \left(\frac{T_{MotorCoil} + T_{GenCoil}}{2}\right) - X \quad (1)$$

where $T_{oil\_est}$ is the estimated oil temperature, $T_{MotorCoil}$ is the sensed temperature of the coils of the motor 16, $T_{GenCoil}$ is the sensed temperature of the coils of the generator 32, and X is an adjustment factor that can vary from vehicle to vehicle. In one example, X is 40, such that the average of the motor coil temperature and the generator coil temperature is reduced by 40 degrees to yield the estimated oil temperature. X can be any other factor, and can be computed through testing by comparing the actual oil temperature with the estimated oil temperature. X can vary with the use of different oil circulation systems 62 or with different electric machines.

Equation 1 is performed by the VSC 12 or any other controller. The VSC 12 thus estimates the oil temperature in the event of a fault or failure of at least one oil temperature sensor 70. Once the oil temperature is estimated, the estimated oil temperature is used in the control system at operation 114 instead of the sensed oil temperature. The final torque adjustment commanded through the transmission 20 and/or to the wheels 58 utilizes the estimated oil temperature instead of the sensed oil temperature at operation 110.

Returning back to operation 106, the VSC 12 determines whether a failure or fault in the coil temperature sensor 86 of the generator 32 is present. If there is a failure or fault, the motor coil temperature is used in the controls at operation 116 instead of the generator coil temperature, and thus the final torque adjustments are made at operation 110 using the motor coil temperatures. If there is no fault at 106, then the generator coil temperatures are used in the torque controls at operation 118. At operation 120, the windings or coils 84 in the motor 16 are analyzed to determine whether a fault exists in the sensor 86 of the motor 16. If there is no fault in the sensor 86 at operation 120, then the motor coil temperatures are used in the torque controls at operation 122. If there is a fault in the sensor 86 of the motor 16, then the generator coil temperatures are used in the torque controls at operation 124 instead of the sensed motor coil temperatures. The final torque adjustments are made at operation 110 using either or both the motor coil and generator coil temperatures.

Referring to FIGS. 1-4, the VSC 12 commands torque to be output by the motor 16 and/or generator 32 to fulfill driver demands based on which of the oil temperature, motor coil temperature, and/or generator coil temperatures are used in the controls as determined at operations 108, 114, 116, 118, and 122. To alter or maintain torque outputs to fulfill driver demands, the VSC 12 commands a current supplied from the battery 14 to the motor 16 and/or generator 32 to alter. Altering the current can include changing the phase in the electric machine, for example. The altering of the current supplied to the electric machine results in an altered torque output by the electric machine. The current can be altered to maintain and satisfy driver demands.

In short, if there is a failure in the oil temperature sensors 70, the driver demand may be fulfilled by altering torque outputs of the electric machines by using the estimated oil temperature based on the coil temperature in at least one of the electric machines. The requested torque outputs are thus maintained utilizing accuracies in the coil temperature sensors rather than inaccuracies in the oil temperature sensors. Furthermore, if there is a failure in a coil temperature sensor 86 in one of the electric machines, then the coil temperature of the other electric machine may be used in the final torque adjustment controls, and in estimating the oil temperature.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a first electric machine (EM) having first coils;
a second EM having second coils;
first and second sensors configured to determine temperatures of the first and second coils, respectively; and
a controller programmed to
alter torque output by the first EM based on the temperature of the first coils, and
in response to a fault in the first sensor, alter the torque output based on the temperature of the second coils.

2. The vehicle of claim 1, further comprising first and second oil temperature sensors configured to determine a temperature of oil provided to the first and second EM, respectively, wherein the controller is programmed to alter the torque based on outputs from the first and second oil temperature sensors.

3. The vehicle of claim 2, wherein the controller is further programmed to, in response to a fault in the first oil temperature sensor and an absence of fault in the first sensor, alter the torque output based on an estimated oil temperature.

4. The vehicle of claim 3, wherein the estimated oil temperature is based on the temperature of the first and second coils.

5. The vehicle of claim 1, wherein altering the torque output by the first EM includes increasing an electric current provided to the first EM.

6. The vehicle of claim 5, wherein increasing the electric current includes altering a phase of the electric current.

7. A method comprising:
altering torque output by a first electric machine (EM) of a hybrid vehicle based on an output of a temperature sensor configured to output a temperature of coils of the first EM; and
in response to a fault in the temperature sensor, alter the torque output by the first EM based on a temperature of coils of a second EM.

8. The method of claim 7, further comprising altering the torque output by the first EM based on an output of an oil temperature sensor configured to output a temperature of oil provided to the first and second EMs.

9. The method of claim 8, further comprising, in response to a fault in the oil temperature sensor and an absence of fault in the temperature sensor, altering the torque output based on the temperature of the coils of the first and second EMs.

10. A vehicle comprising:
a first electric machine (EM) having first coils;
a second EM having second coils;
an oil line for providing oil to the first and second EMs;
an oil temperature sensor configured to determine a temperature of the oil; and
a controller programmed to, in response to a fault in the oil temperature sensor, alter a torque output by the first EM based on a temperature of the first and second coils.

11. The vehicle of claim 10, wherein the controller is programmed to, in response to an absence of the fault in the oil temperature sensor, alter the torque based on an estimated oil temperature.

12. The vehicle of claim 11, wherein the estimated oil temperature is based on a temperature of the first and second coils.

13. The vehicle of claim 10, wherein altering the torque output by the first EM includes increasing an electric current provided to the first EM.

14. The vehicle of claim 13, wherein increasing the electric current includes altering a phase of the electric current.

* * * * *